United States Patent [19]

Lindenbeck

[11] Patent Number: 5,676,466
[45] Date of Patent: Oct. 14, 1997

[54] MULTIPLE-USE SHIPPING BAG

[76] Inventor: Heinrich Lindenbeck, Staudingerstrasse 50, D-81735, Munchen, Germany

[21] Appl. No.: 676,294
[22] PCT Filed: Nov. 13, 1995
[86] PCT No.: PCT/EP95/04441
   § 371 Date: Jul. 15, 1996
   § 102(e) Date: Jul. 15, 1996
[87] PCT Pub. No.: WO96/15038
   PCT Pub. Date: May 23, 1996

[30] Foreign Application Priority Data

Nov. 14, 1994 [DE] Germany ............... 44 40 654.1

[51] Int. Cl.⁶ ............... B65D 33/34; B65D 27/04
[52] U.S. Cl. ............... 383/5; 229/71; 229/72; 229/80
[58] Field of Search ............... 229/71, 72, 80, 229/82; 383/5

[56] References Cited

U.S. PATENT DOCUMENTS

| | | | |
|---|---|---|---|
| 1,135,064 | 4/1915 | Shipley | 229/82 |
| 1,385,248 | 7/1921 | De Vaughn | 229/71 |
| 1,964,596 | 6/1934 | Overly | 229/71 |
| 3,150,473 | 9/1964 | Lemelson | 229/71 X |
| 3,151,803 | 10/1964 | Kaminski | 229/80 |
| 3,315,878 | 4/1967 | Hiersteiner | 229/72 |
| 4,288,028 | 9/1981 | Diaz | 229/71 X |

FOREIGN PATENT DOCUMENTS

| | | | |
|---|---|---|---|
| 1596517 | 7/1970 | France | 229/71 |
| 2158471 | 6/1973 | France | 383/5 |
| 9016450 | 4/1991 | Germany | 229/80 |
| 411742 | 6/1934 | United Kingdom | 229/72 |
| 2113611 | 8/1983 | United Kingdom | 229/71 |

Primary Examiner—Jes F. Pascula

[57] ABSTRACT

The present invention relates to a multiple-use shipping bag comprising a wrapper which has a front wall (10) and a rear wall (12) of substantially opaque plastics material, and an opening for the introduction of material to be dispatched, wherein said front wall (10) has a cut-out which is in the form of an address window (34) and which is covered on the inside by means of a transparent layer (14), wherein said transparent layer (14) extends in the interior of the wrapper over at least the inside surface of the front wall (10) and is non-releasably connected to the front wall (10) in the region of the address window (34), and wherein a closure flap (20) adjoining said rear wall (12), for closing said opening, is provided in such a way that it can be introduced and inserted between said front wall (10) and said transparent layer (14).

13 Claims, 3 Drawing Sheets

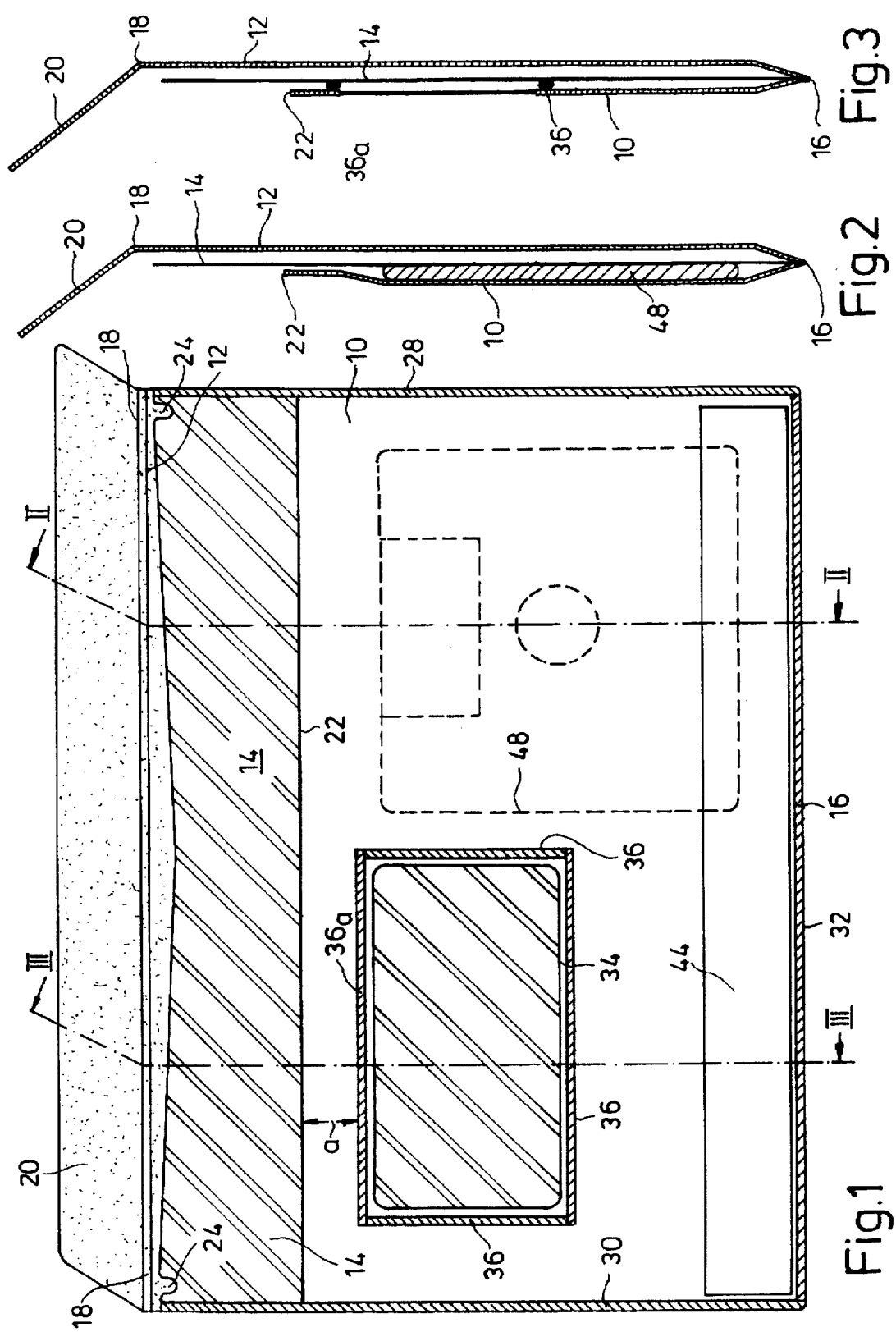

MULTIPLE-USE SHIPPING BAG

The present invention relates to a multiple-use shipping bag as known from German utility model 90 16 450.4.

From this prior art document as well as from other references the problem to prevent waste is known; in particular envelopes or similar shipping containers should be designed as recyclable products and, for this reason, should be manufactured out of durable plastics material.

However, such a conventional multiple-use shipping bag, besides the material used, still mainly focuses on classical envelopes (like the ones made from paper or cardboard) such that a closing by the user and thereby a handling of the devices is troublesome and unsatisfying: Such a prior art shipping bag in particular, like the classical envelope, provides for the closure flap at the back side to be glued to the envelope by (multiple-use) glue or adhesive tape. Thereafter, a conventional stamp has to be applied to the front side, which, when the shipping bag is to be re-used, will have to be drawn off with effort.

Finally, production of such a shipping bag is difficult and cumbersome, since strong and comparatively thick plastics material must be cut, folded in shape and permanently sealed along the seams like a conventional envelope. In addition, there is the manufacturing challenge to provide an address window on the front side of the prior art shipping container.

A further recyclable shipping container is known from German utility model 91 08 653.1, which has been designed with at least one of the walls entirely made of transparent plastics material. By that means, an addressing of letters would be facilitated, however, for general use in postal services such a shipping container is not ideal since the contents of the shipping container, beyond the address, would be visible from the outside.

Finally, from German patent application DE 37 44 621 A1, not only a multiple-use shipping bag made of plastic foil with a transparent front side is known, in addition, the front side has a cut-out section in the area where the stamps or stamp imprints are to be placed, allowing access to the paper inside (which is to be provided with the franking directly). In this case, not only is confidential information potentially visible from the outside, also the partial opening of the container in the area of franking is a feature which could, particularly in a humid environment, impair the goods to be dispatched, and for this reason, this prior art container would not be suitable for universal use.

Thus, it is the principle object of the present invention to provide a multiple-use shipping bag which permits an easier handling as well as simplified production, and which, in addition, may be used for mailings without the content of the bag (with the exception of the address) visible from the outside.

This object is achieved by the multiple-use shipping bag having the features of patent claim 1.

The multiple-use shipping bag according to the invention provides for a compartment for goods to be mailed between the transparent layer and the back wall, and on the front side, the shipping bag can be closed simply by inserting or introducing the closure flap into the pocket formed between the transparent layer and the front wall, without further adhesive tapes or joints necessary.

Also, since the front wall is connected to the transparent layer through the connection in the address window region, the pocket for the closure flap is created in a simple manner, without additional joints necessary which would have caused increased production effort.

For production, it has additionally turned out to be particularly useful not only to provide the transparent layer inside the envelope for covering the address window in this region, but also to provide it as a full layer extending between the lateral edges of the shipping container. Particularly, the material for the transparent layer is to be chosen with the feature of better and quicker melting than the other plastics material layers of the front wall and the back wall, such that the transparent layer works as a glue material in the welding regions.

Further useful embodiments of the invention are described in the depended claims.

It has proved to be particularly advantageous that the back wall with the closing flap adjoining have been designed integrally out of the plastics material, and that the front wall, the transparent layer, and the back wall are welded at three peripheral sides. By these measures, the shipping bag may be easily manufactured in large quantities and with little effort out of continuous web material.

Particularly, the transparent layer inside the bag extends along the total height of the shipping bag, whereas the front wall is of a lesser height (relative to the opening). Thereby, a closing the of the bag is facilitated, since only a short section of the closure flap will have to be inserted between the front wall and the transparent layer and, on the other hand, the goods to be mailed are kept optimally protected by the drawn-up transparent layer, even when the closure flap has not been closed yet.

For improving and simplifying the insertion of goods, the edge of the transparent layer facing the opening is provided with a slight V-shaped cut-out, which may additionally be provided with lateral punch-outs. In the case of a multiple-use of the bag, this measure prevents tearing of the transparent layer.

Furthermore, connecting the front wall and the transparent layer by a welded seam surrounding the address window is advantageous. On the one hand, this welded seam limits a maximum depth of insertion of the closure flap between the front wall and the transparent layer, and on the other hand, a vertically extending seam portion of the welding seam laterally defines an additional insertion compartment. This compartment is provided in front of the actual main shipping compartment, and is separated therefrom by the transparent layer, the additional compartment having a suitable shape for transporting discs or the like data carriers. In the case that the multiple-use shipping bag according to the invention, with regard to the goods to be shipped, has a larger height, it is useful to provide a welding seam limiting the additional compartment on a bottom side thereof.

A further advantage of the welded seam surrounding the address window is that the upper portion of the seam prevents, in the case that the shipping container contacts other letters, postcards or the like in a mailbox or a postman's bag, small objects to slip unintentionally along the inserted closure flap into the interior of the shipping bag.

It is particularly advantageous that the multiple-use shipping bag according to the invention may additionally be closed by an adhesive seal which is to be applied in a suitable manner on the front surface and which, with the closure flap inserted, connects the latter with the front wall.

The useful arrangement of this adhesive seal in the upper region of the front wall surface is not only a means of closure, but the seal has additionally been designed to place stamps, other kinds of franking and the like imprints thereon, with no further need of additional fixing elements or the like.

Particularly when using this shipping bag for secret documents, it has proved to be advantageous to provide the closure seal with a non-elastic, inflexible coating which reveals any opening attempt by showing cracks or the like.

The invention is also directed to an alternative design of closing the multiple-use shipping bag by folding, for which independent protection is sought: to close the envelope, the closure flap can be moved over the opening and inserted into a pocket open towards the bottom side (i.e. arranged opposite to the opening), which pocket may be produced preferably by folding over and fixing a section of the front wall layer (alternatively, the transparent layer) at the sides thereof, and with the closure flap having a trapezoidal or dovetail form with the short face adjacent the folded edge.

Such an alternative type of closing is also well suited for use of the above adhesive seal according to the invention. This aspect of the invention could alternatively be realized without address window or transparent layer, or on the back wall of a shipping bag.

Further objects, features and advantages of the present invention will be apparent from a consideration of the following description when taken in connection with the appended claims and the accompanying of drawing in which:

FIG. 1 is a front view of the multiple-use shipping bag according to the present invention in a preferred embodiment, shown with an open closure flap;

FIG. 2 is a sectional view of the shipping bag along line II—II in FIG. 1;

FIG. 3 is a sectional view of the shipping bag along the line III—III in FIG. 1;

Figure 4:
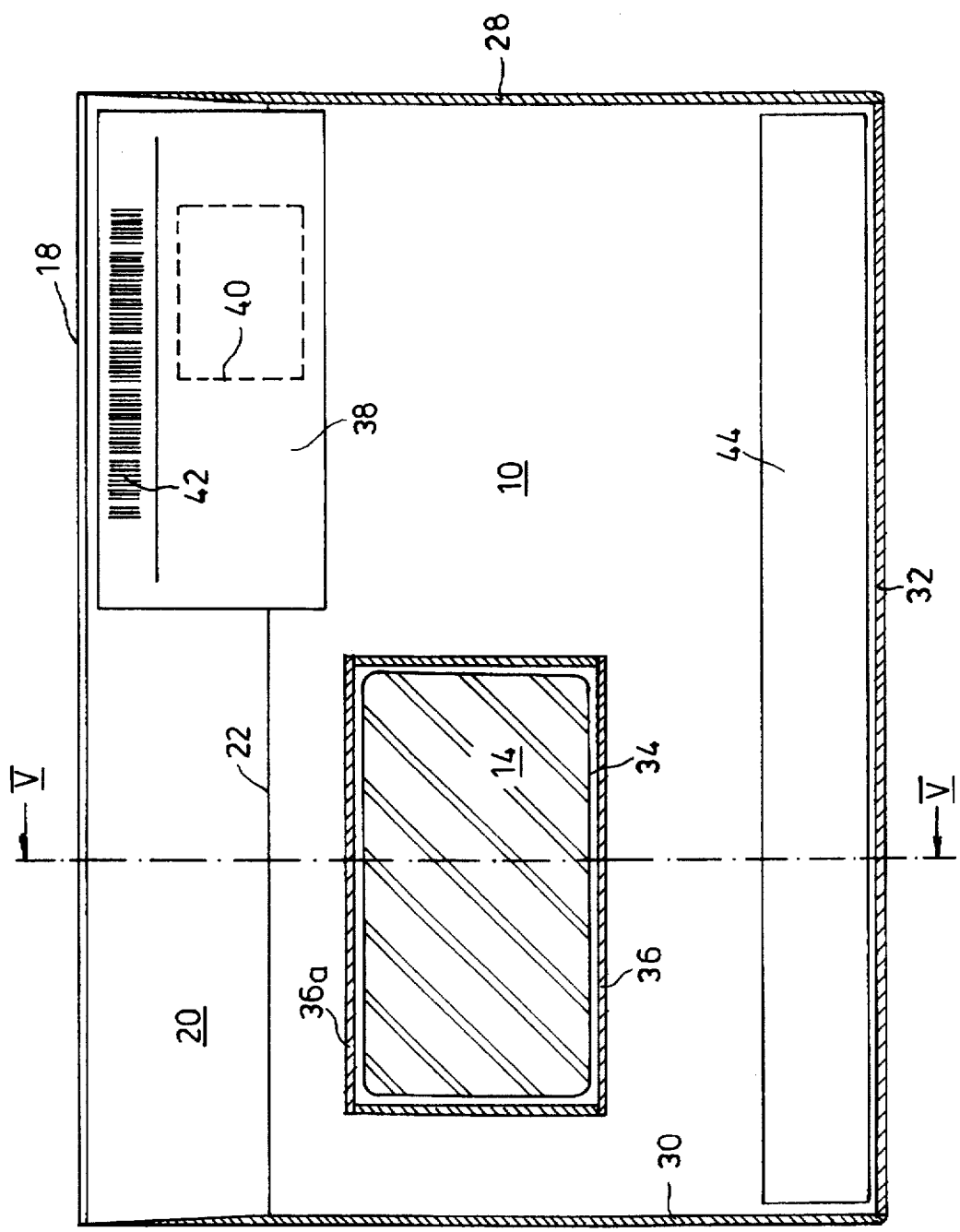
FIG. 4 is a front view of the multiple-use shipping bag with inserted closure flap and closing seal applied.

A multiple-use shipping bag of a first, preferred embodiments of the invention for shipping documents of A5 format includes—as shown in FIGS. 1 through 5—in essence three layers: a front wall (front side) 10, a back wall (back side) 12 plus a transparent intermediate layer 14. The front wall 10 is either integrally formed with the back wall 12 via a bottom fold 16, with the back wall 12 integrally connected to a closure flap 20 via a pliable fold 18, such that a rectangular pocket is realized which can be closed on the wide side thereof. Alternatively, the shipping bag is composed of discrete sheets of material and as front and back walls.

The elements 10, 12, 20 previously described are formed out of an essentially opaque, water and moisture resistant plastic sheet, preferably made of polypropylene (PP), with web material having a textured surface cut into sections and folded. As it becomes obvious from the sectional views according to FIGS. 2 and 3, the front wall 10 having an upper edge 22, extends to below the pliable fold 18, and thus, it does not extend over the total height of the back wall 12.

The intermediate layer 14 provided between the front wall 10 and the back wall 12 is formed of a transparent plastics layer, preferably of transparent polypropylene (PP), and extends all along from the bottom fold 16 up to the pliable fold 18. Referring to FIG. 1, as the front view of the shipping bag with the open closure flap demonstrates, the intermediate layer 14 has a slight V-shaped cut-out in the upper edge 22 below the pliable fold 18. Furthermore, the intermediate layer 14, in the free upper portion thereof, comprises lateral, semi-circular cut-outs 24, formed by punching. Through these measures, a closing of the shipping bag is improved (V-shape), and a tearing destruction of the upper region of the intermediate layer trough frequent use may be prevent (punch-outs 24, 26).

The front wall 10, the intermediate layer 14, and the back wall 12 are permanently connected along the edges by means of welding 28, 30 in a moisture-proof and air-tight manner. Additionally, a bottom welding 32 in the region of the bottom fold 16 connects the PP front wall 10 and the back wall 12 with the transparent intermediate layer 14. In the case that the front wall 10, and the back wall 12 are formed integrally of continuos web material, the bottom welding 32 is not necessary.

The PP material of the transparent intermediate layer 14 has melting properties which provide for a melting at a temperature below a melting temperature of the plastics material of the other walls. This leads to an effect advantageous for manufacturing in that the transparent intermediate layer, provided between the front layer and the back layer when employing three layers, serves as a glue for producing a durable connection of the layers along the welding seams.

The front wall 10 comprises a cut-out 34 of essentially rectangular shape which is suitably arranged in correspondence to an address field on a business letter, and which exposes the transparent intermediate layer 14 underneath. Along the edges of the cut-out 34, the front wall 10 is connected to the intermediate layer 14 by means of a surrounding welding seam 36, with an upper seam portion $36_a$ of the surrounding seam 36 provided in a distance $a$ of about 5 to 20 mm, preferably 12 mm, from the upper edge 22 of the front wall 10.

The height of the closure flap 20 has been designed such that in a state of closing (i.e. with the flap inserted between the front wall 10 and the intermediate layer 14) the flap extends over the upper edge 22 up to about the upper seam portion $36_a$. Thereby, the closure flap 20—designed in an inverted V-shape, i.e. having a slight pointed shape, for easy insertion between the front wall 10 and the intermediate layer 14—may be closed in a simple manner and held between the upper region of the front wall 10 (down to seam portion $36_a$) and the intermediate layer 14 in a clamp-like manner.

For an additional sealing of the bag, closing seal 38 depicted in FIG. 4 is provided which can be sticked onto the shipping bag covering a portion of the closure flap 20 as well as an upper portion of the front wall 10 when the closure flap 20 is inserted. Attached as described above, the adhesive seal 38 not only serves to additionally close and seal the shipping bag, but also provides additional space for stamps or stamp imprints (schematically shown in FIG. 4 with reference numeral 40), as well as additional space for markings (bar code 42) or the like printings.

For an attachment in the above described manner, the closure seal comprises an adhesive layer at a bottom surface thereof, which—adapted to the structured surfaces (outer surfaces) of the front wall 10, and the flap 20—may be removed essentially without residue.

The described embodiment further comprises a writing and labeling space 44 in a bottom region of the front wall 10, said space preferably having a smooth surface for facilitating a writing thereon, or an attachment of advertising.

The above described embodiment has edges of 238 mm (width) and 166 mm (height) when closed and has been designed for accommodating documents 46 to be shipped in oblong DIN A5 format with the bottom edge of the address window 34 having a distance of about 60 mm from the bottom fold 16.

Figure 5:
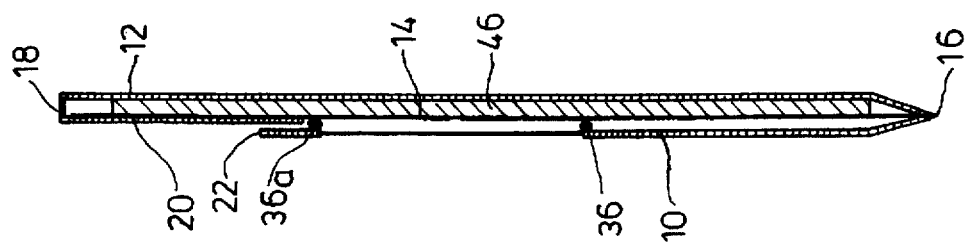
FIG. 5 is a sectional view of the shipping container along the line V—V in FIG. 4.

With reference to the sectional view in FIG. 5, the documents 46 to be shipped are introduced into the interior of the bag between the back wall 12 and the intermediate layer 14. Accordingly, an address (provided correspondingly on the document) may be read through the address window 34 on the front side.

Additionally, adjacent to the address window 34, an inner pocket (an inner compartment) between the front wall 10 and the intermediate layer 14 is formed, laterally delimited by the rightward welding seam 28, and the surrounding welding seam 36 of the address window 34, respectively, and closed on the bottom side by welding 32. In the embodiment shown, this additional compartment thereby has a width of about 150 mm and a height (up the upper edge 22) of about 130 mm, optimally suited for accommodation a conventional 3,5" diskette 48 or the like data carrier (shown in the sectional view in FIG. 2).

As will become immediately apparent to the person skilled in the art from the above-described construction of the shipping bag according to the present invention, manufacturing thereof is extremely simple: Only three circumferential weldings 28, 30, 32 of the front wall 10 and the back wall 12, and the intermediate layer 14 plus a surrounding welding 36 in the region of the cut-out 34 for the address window between the front wall 10 and the intermediate layer 14 are to be performed.

When using the shipping bag, a user—having introduced goods 46 to be shipped and/or an additional diskette 48 from above into the shipping bag—folds over the closure flap 20 and introduces the free end thereof into the slot formed between the upper edge 22 of the front wall 10 and the intermediate layer 14. Thereafter, the shipping bag is sealed by affixing the adhesive seal 38, which, if necessary, has already been provided with a stamp imprint or further markings, rendering the bag ready for shipment.

On the side of the receiving person, the multiple-use shipping bag of the present invention can be opened simply by removing the closure seal 38, e.g. by putting a thumb between the front wall 10 and the intermediate layer 14 in the region of the upper edge 22 adjacent to the seal, and by pulling out the closure flap 20. A simple re-closing (and thereby a re-use, or multiple-use) of the shipping bag according to the present invention can than be achieved merely by applying a new adhesive seal 20.

According to a modified version of the present invention, the closure seal 20 may be provided with means rendering an invisible removal and re-closing of the bag impossible: the seal 20 could be provided with rupture points preventing a removal of the closure seal without destroying the same. Alternatively or in additional, the closure seal 20 could be provided with a coating, e.g. a suitable paint, which is brittle, and non-elastic and produces cracks if the seal is subjected to significant bending or curving (which would occur during a pulling-off). Paint suitable for this purpose may be e.g. a transparent resin film rendered brittle and non-elastic by means of an additional hardening agent. Epoxy resin or polyester coatings with comparable characteristics are also well suited for this purpose.

For mailing printed matter, for example, the shipping bag according to the present invention may be used without a closure seal; the bag is nevertheless be closed reliably and safe, and may be opened easily for inspection.

For use with an automatic franking machine, the closure seal 38 is provided of paper or of a similar material, with a suitable glue on the back surface thereof and has a size such that the franking machine may put the stamp imprint onto the designated position on the seal.

As a further modification it would be possible that—like regular stamps—a plurality of pre-franked closures seals combined in a pad or the like may be purchased and only need to be affixed to the bag in order to make the same ready for shipment.

While the above embodiments have been particularly suitable for use with documents of DIN A5 format, a transfer of the inventive solution to other sizes and formats may easily be achieved:

A slightly wider and higher envelope would be ideal for shipping CD-ROMs (in between the front wall 10 the intermediate layer 14) together with suitable written accompanying documents. A doubling of the inner space to A4 format is possible by correspondingly lowering the above-described shipping bag on the bottom side (in this case, however, it would be advantageous to provide an intermediate seam at the height of the bottom fold 16 described above for format A5, which intermediate seam would then limit the additional insertion compartment to disk size, and would further re-enforce and stiffen the A4 vertical format shipping bag).

A further modification of the above embodiments with regard to an alternative construction of the closure flap will be described below referring to FIGS. 6 to 8.

Figure 6:
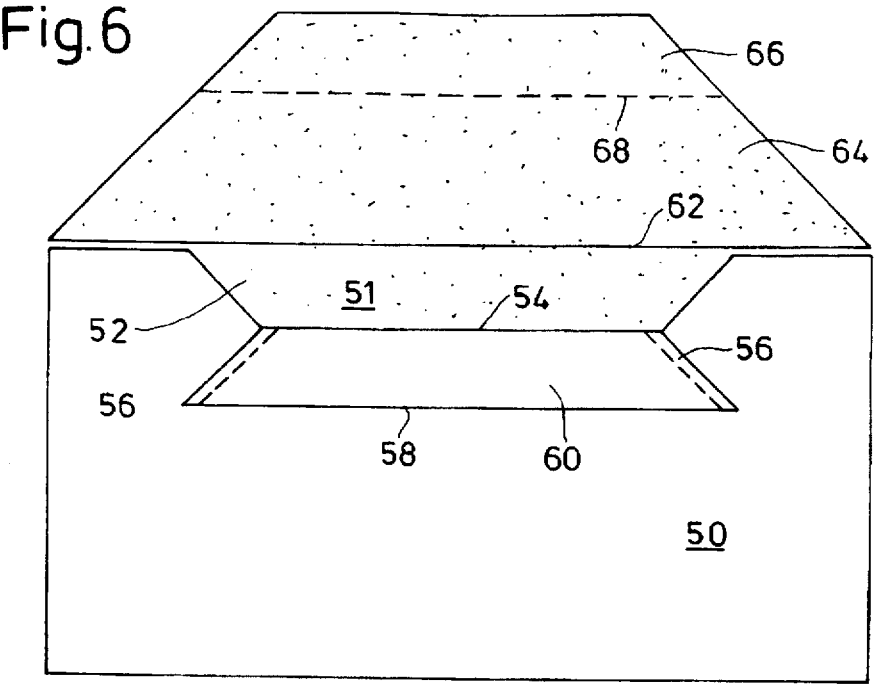
FIG. 6 is a view of an alternative closing of a multiple-use shipping bag according to another embodiment of the invention.

The principle view in FIG. 6 depicts a shipping bag in the oblong format, corresponding to the above embodiments, or for use with any other shipping bag.

A front wall 50 comprises a trapezoidal or dove-shaped cut-out 52, with the dove-shaped element separated from the cut-out 52 folded along axis 54 and attached to the front surface 50 by means of lateral welding seams 56. Thus, an open insertion pocket 60 is formed in the region of the edge 58.

A covering flap 64 is connected to the back wall 51 (provided below the front wall 50), with the flap 64 having a flap section 66 at its end folded back over a folding axis 68 to the surface of the covering flap 64 visible in FIG. 6.

Figure 7:
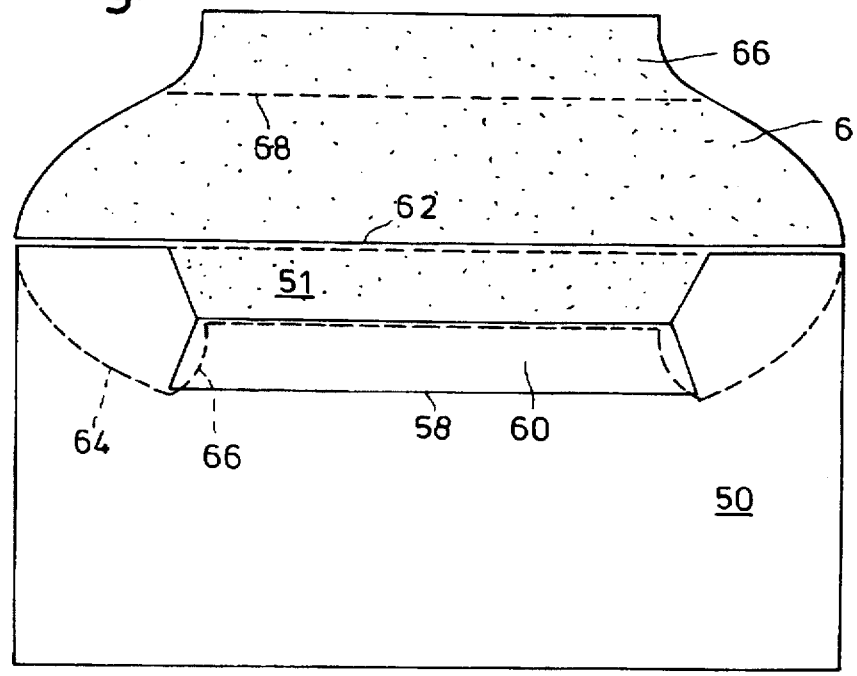
FIG. 7 is a view of a further development of the embodiment shown in FIG. 6.

The dashed line of FIG. 7 (with FIG. 7 giving a further modification of the bag according to FIG. 6 with a rounded shape of the covering edge) illustrates the mode of closure of the bag: the folded flap section 66 reaches into the insertion pocket 60 and is held therein (with the covering flap 64 lying upon the front wall 50), such that a simple and nevertheless safe closing is possible.

Figure 8:
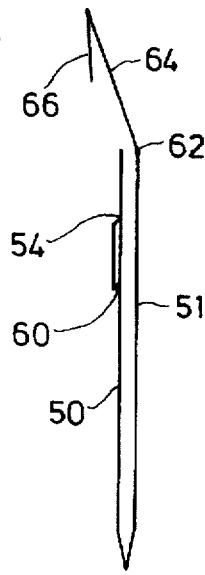
FIG. 8 is a sectional view of the shipping bag in FIG. 7.

The side view in FIG. 8 is a sectional view through the middle of the shipping bag shown in FIG. 6 or 7 and additionally illustrates the structural relationship of the elements of the bag.

The necessary geometries of the covering flap 64, the flap section 66, the cut-out 52 and the insertion pocket 60 as well as the sizes of these elements directly result from their intended inter-action. It is particularly advantageous if the width of covering flap 64 between the pliable fold 62 and the axis 68 is equal to the distance between the pliable fold 62 and the edge 58 (or the opening of the insertion pocket 60), such that in a closed state the flap section 66 completely reaches into the insertion pocket 60.

When using the closing mechanism of FIG. 6 through FIG. 8 with embodiments of the shipping bag described in connection with FIGS. 1 to 5, it should be assured that the position of the address window 34 (established by corresponding norms) is not changed. The closure mechanism as described in FIGS. 6 to 8 could then be provided with a closure seal in the above-described manner, preferably in the upper-right hand corner of the bag.

All the previously described embodiments of the shipping bag were realized by means of a PP plastics foil, which has been dyed (preferably black) for the outside envelope of front wall and back wall, and which foil comprises an outer surface finish regularly structured and similar to a leather surface; however, any other surface finish which could suitably improve handling of the shipping bag is possible and included under the invention. Particularly, it is within the scope of the person skilled in the art, to build the shipping bag according to the invention not only from (single-layer) plastics material but instead use multi-layer stiffened and/or adequately lined materials suitable for a particular packing and shipping purpose.

Furthermore, it is up to the producer to provide the shipping bag according to the present invention with further spaces of the kind of the writing space 44 at appropriate regions, said spaces being suitable in a particularly simple manner for providing advertisement, markings or the like.

I claim:

1. A multiple-use shipping bag comprising a wrapper which has a front wall and a rear wall of substantially opaque plastics material, and an opening for the introduction of material to be dispatched, wherein said front wall has a cut-out which forms an address window, said front wall being covered on the inside by means of a transparent layer, wherein said transparent layer extends in the interior of the wrapper over at least the inside surface of the front wall and is non-releasably connected to the front wall in the region of the address window, a closure flap being provided adjoining said rear wall, for closing said opening, and for introducing and inserting between said front wall and said transparent layer, said rear wall and the closure flap being integrally formed, and said shipping bag being made from three continuous webs which correspond to the front wall, the transparent layer, and the rear wall, and which have edges which are welded together.

2. The multiple-use shipping bag according to claim 1, wherein said transparent layer extends in the interior of the wrapper over substantially the entire surface of the rear wall, and wherein the height of the front wall is reduced in a direction towards the opening.

3. The multiple-use shipping bag according to claim 2, wherein the edge of said transparent layer, which is towards the opening, has an obtuse-angled, V-shaped cut-out.

4. The multiple-use shipping bag according to claim 1, wherein said transparent layer is joined to said front wall by means of a welded seam which extends around said address window and which has an upper seam portion delimiting introduction or insertion of said closure flap at a bottom side, with a seam portion defining an additional insertion compartment between said transparent layer and said front wall laterally of the address window.

5. The multiple-use shipping bag according to claim 4, wherein said additional insertion compartment is defined at a bottom side thereof by a welded seam which non-releasably connects at least said front wall to said transparent layer and which extends substantially parallel to said opening, and wherein said additional insertion compartment is of such a height and width that it is suitable for accommodating a diskette or a CD-ROM.

6. The multiple-use shipping bag according to claim 1, in which the closure flap is inserted between the front wall and the transparent layer and including an adhesive seal which covers an outwardly disposed region both of the closure flap and also the front wall, and which is releasably fixed on said shipping bag.

7. The multiple-use shipping bag according to claim 6, wherein said adhesive seal is of a self-adhesive nature on the side towards the shipping bag, and having on its front a surface which is suitable for permanent application of printing or a stamp imprint.

8. The multiple-use shipping bag according to claim 6, wherein said adhesive seal is provided with a non-elastic coating which has permanent visible cracks upon bending or detachment of the adhesive seal.

9. The multiple-use shipping bag according to claim 8, wherein said covering is a substantially transparent synthetic resin-based lacquer.

10. The multiple-use shipping bag according to claim 1, in combination with an adhesive seal which is adapted to cover an outwardly disposed region both of the front wall and also of the closure flap when the closure flap is inserted between the front wall and the transparent layer, said adhesive seal being adapted to be releasably fixed on the shipping bag.

11. The multiple-use shipping bag according to claim 10, in which said adhesive seal is of a self-adhesive nature and has on its front a surface which is suitable for permanent application of printing or a stamped imprint.

12. The multiple-use shipping bag according to claim 10, wherein said adhesive seal is provided with a non-elastic coating which has permanent visible cracks upon bending or detachment of the adhesive seal.

13. The multiple-use shipping bag according to claim 12, wherein said covering is a substantially transparent synthetic resin-based lacquer.

* * * * *